United States Patent [19]

Mohan et al.

[11] 4,272,401
[45] Jun. 9, 1981

[54] REGENERATION OF SPENT HYDRODESULFURIZATION CATALYST WITH HETEROPOLY ACIDS

[75] Inventors: Raam R. Mohan, Berkley Heights; Gopal H. Singhal, Westfield, both of N.J.

[73] Assignee: Exxon Research & Engineering Co., Florham Park, N.J.

[21] Appl. No.: 59,072

[22] Filed: Jul. 19, 1979

Related U.S. Application Data

[63] Continuation of Ser. No. 938,796, Sep. 1, 1978, abandoned.

[51] Int. Cl.$^3$ .............. B01J 23/94; B01J 23/92; B01J 21/20; C10G 23/02
[52] U.S. Cl. .................. 252/413; 208/216 R; 252/412; 252/414; 423/68; 423/150
[58] Field of Search .............. 252/411 S, 412, 413, 252/414, 416; 208/216 R, 216 PP; 423/68, 150

[56] References Cited

U.S. PATENT DOCUMENTS

| 2,547,380 | 4/1951 | Fleck ................... 252/465 |
| 3,147,209 | 9/1964 | Erickson et al. ................ 208/120 |
| 3,147,228 | 9/1964 | Erickson .................. 208/120 |
| 3,259,588 | 7/1966 | Harvey et al. ............. 252/412 |
| 3,403,111 | 9/1968 | Colgam ................. 252/465 |
| 3,562,150 | 2/1971 | Hamilton et al. ............. 208/216 |
| 3,635,838 | 1/1972 | Gatsis ................... 252/415 |
| 3,791,989 | 2/1974 | Mitchell et al. ............. 252/413 |
| 4,066,574 | 1/1978 | Tamm .................. 208/216 R |

FOREIGN PATENT DOCUMENTS

| 741201 | 4/1970 | Belgium . |
| 834257 | 4/1976 | Belgium . |
| 123687 | 7/1967 | Czechoslovakia . |
| 51-1023495 | 2/1976 | Japan . |
| 644239 | 10/1950 | United Kingdom ........... 252/413 |
| 1528927 | 10/1978 | United Kingdom . |

Primary Examiner—P. E. Konopka
Attorney, Agent, or Firm—D. W. Collins; Edward M. Corcoran

[57] ABSTRACT

Contacting deactivated hydrodesulfurization catalyst, such as Co-Mo supported on alumina, with a heteropoly acid, such as molybdophosphoric acid or tungstosilicic acid, in pH range of about 1 to 3 and temperature range of about 20° to 80° C., results, before any coke is burned off the catalyst, in selective abstraction of vanadium and nickel, removal of sulfur, increase in surface area, and increase in pore volume of the catalyst. Subsequent cobalt doping of demetallized catalyst followed by calcination promotes decoking, additional sulfur removal and additional increase in surface area and pore volume. The process results in substantially complete regeneration of catalytic activity.

19 Claims, No Drawings

REGENERATION OF SPENT HYDRODESULFURIZATION CATALYST WITH HETEROPOLY ACIDS

This is a continuation of application Ser. No. 938,796, filed Sept. 1, 1978, now abandoned.

BACKGROUND OF THE INVENTION

1. Field of the Invention

The present invention is related to regeneration of spent catalysts used in hydrofining operations, and, more particularly, to the regeneration of spent catalysts employed in hydrodesulfurization and hydrodenitrogenation by treatment with a heteropoly acid.

2. Description of the Prior Art

As is well-known, hydrodesulfurization of, e.g., petroleum fractions, is carried out employing an alumina catalyst support impregnated with Group VIB and VIII metals such as molybdenum and cobalt. While such catalysts are extremely useful in reducing sulfur content, the effectiveness of these catalysts is diminished during the course of processing as a result of two problems. First, carbon residues (coke) deposit on the surface of the catalyst, thereby reducing the effective surface area and pore size for catalytic activity. Second, heavy metals in the feedstock, such as nickel and, more importantly, vanadium, tend to poison the catalyst, again resulting in reduced catalytic activity. During the course of processing, the temperature is generally increased at a predetermined rate in order to compensate for the coking and poisoning effects. However, as the temperature is increased, a greater percentage of the feedstock is cracked, thereby resulting in a decrease of desirable product. Further, the increase in processing temperature results in an increase in the deposition rate of carbon residues.

Regeneration of spent catalysts has been the subject of much investigation and, consequently, a number of approaches for regenerating hydrodesulfurization catalysts have been developed. In particular, acidic media, such as mineral acids, anhydrous HF, oxalic acid and other carboxylic acids and acidified amine solutions, have been employed. However, such methods either (1) result in removal of unacceptable amounts of catalytically active metals, e.g., cobalt and molybdenum, as well as some solubilization of the support material, e.g., alumina, or (2) do not regenerate a sufficiently high degree of catalytic activity, so that catalytic activity of the regenerated catalyst is considerably inferior to that of fresh catalyst.

SUMMARY OF THE INVENTION

In accordance with the invention, spent catalyst which has been used in hydrofining of hydrocarbon feedstock is regenerated by contacting the spent catalyst with a heteropoly acid. The method disclosed results in the extraction of about 60 to 90% vanadium, about 90% nickel and about 50% cobalt, with essentially no loss of molybdenum and aluminum and with preservation of the structural integrity of the support. Extraction of metals is accompanied by partial removal of sulfur and by substantial increase in pore volume and surface area. Further processing by doping the demetallized catalyst with cobalt followed by calcination markedly promotes carbon decoking, further sulfur removal and additional increase in surface area and pore volume. Hydrofining activity and product selectivity of the regenerated spent catalyst is substantially the same as that of fresh catalyst.

DETAILED DESCRIPTION OF THE INVENTION

Regeneration of substantially complete catalytic activity in spent hydrodesulfurization catalysts is accomplished by contacting spent catalyst with a heteropoly acid under mild conditions of pH, temperature and agitation.

The hydrodesulfurization catalysts which may be treated in accordance with the invention include those supported catalysts having Group VIB and VIII metals, including nickel, cobalt, tungsten and molybdenum and combinations of these. The metals may be in elemental, oxide or sulfide form or any combination thereof. The support may be any refractory oxide or other inert support, including alumina.

The spent catalyst may be pre-cleaned with an organic solvent to remove contaminating surface oils prior to contact by the heteropoly acid. Alternatively, spent catalyst may be contacted by both organic solvent and heteropoly acid substantially simultaneously.

The organic solvent can vary over a wide range of hydrocarbons comprising aliphatics, aromatics, cycloparaffins or mixtures of these, preferably boiling below about 250° C. Examples of suitable organic solvents include decane, benzene, toluene, xylene, cyclohexane and tetralin. Cracked naphtha can also be used. The object of the solvent extraction process is to render the surface and the bulk of the catalyst more accessible to the heteropoly acid, and thereby effect efficient removal of the contaminating metals, e.g., vanadium and nickel.

Contacting the spent catalyst with heteropoly acid may be accomplished employing any of the contacting processes usually used in petroleum processing, such as in a stationary phase or mildly agitated condition or in a plug flow reactor or in a continuous moving concurrent or countercurrent liquid-solid bed reactor. The temperature of the process ranges between ambient to about 80° C., and preferably about 30° to 60° C., to maintain the stability and concentration of the heteropoly anion.

An aqueous solution of the heteropoly acid is preferably employed. The concentration of heteropoly acid in aqueous solution ranges from about 0.1 to 25 wt. %, and preferably about 0.2 to 6 wt. %. The concentration of the heteropoly acid is chosen on the basis of the loading of the toxic metal contaminants, with higher concentrations being associated with higher concentrations of contaminants.

The pH of the solution ranges from about 1 to 3, and preferably about 1.5 to 2.5, to maintain stability of the heteropoly acid in solution.

The spent catalyst is contacted with the heteropoly acid for about 4 to 200 hours, and preferably about 15 to 90 hours, depending on the amount of metals to be removed. The longer times are associated with higher concentrations of contaminants. The heteropoly acid may be optionally replaced with fresh acid at suitable intervals, such as about 10 hours, to accelerate removal of the contaminating metals.

Heteropoly acids useful in the practice of the invention have the general formula $H_x(YM_{12}O_{40})$, where Y is at least one element selected from the group consisting of phosphorus, silicon, titanium, germanium, arsenic, zirconium, thorium and cerium, M is at least one element selected from the group consisting of molybdenum, tungsten, niobium and tantalum and x is 3 when Y is pentavalent (P, As) and x is 4 when Y is tetravalent (Si, Ti, Ge, Zr, Ce, Th). Up to one-half of M may be replaced by at least one element selected from the group consisting of nickel, cobalt and vanadium. During recrystallization of a heteropoly acid, a hydrated species of the acid is usually obtained, as is well-known. The number of water molecules depends on the particular process of recrystallization of the heteropoly acid and, while typically ranging from about 5 to 50, is not critical. Examples of heteropoly acids useful in the practice of the invention include molybdophosphoric acid, $H_3(PMo_{12}O_{40})$, molybdosilicic acid, $H_4(SiMo_{12}O_{40})$, tungstosilicic acid, $H_4(SiW_{12}O_{40})$, and tungstophosphoric acid, $H_3(PW_{12}O_{40})$.

For Co—Mo/$Al_2O_3$ catalysts, a molybdenum-containing heteropoly acid is preferred, since it has been found that heteropoly acid treatment incorporates molybdenum in the $Al_2O_3$ support in a dispersed manner without phosphorus overloading. An example of a heteropoly acid particularly useful in the practice of the invention is molybdophosphoric acid (MPA) having the general formula $H_3(PMo_{12}O_{40}).nH_2O$, for example, $H_3(PMo_{12}O_{40}).36H_2O$.

The method disclosed above results in the extraction of about 60 to 90% vanadium, about 90% nickel and about 50% cobalt, together with substantial increase in both surface area and pore volume of the catalyst. The alumina-based support remains essentially unchanged. This process also results in molybdenum loading on the support in a well-dispersed manner without aggregation or cluster formation. Surprisingly, excess phosphorus loading is avoided by the process of the invention. Finally, the extraction of vanadium, nickel and cobalt results in a substantial reduction in sulfur build-up in the catalyst. While not subscribing to any particular theory, it appears that the reduction is due to removal of sulfur in the form of oxysulfides, oxysulfites or oxysulfates of the metals.

As described above, the process results in substantial removal of metals which tend to poison the catalyst, with consequent removal of other contaminants such as sulfur and concommitant regeneration of catalytic activity. However, it has also been found that one-time (1X) impregnation of the heteropoly acid-treated catalyst with a cobalt salt, followed by calcination at moderate temperatures of about 450° C. or less in air, results in the substantial removal of carbon as well as further removal of sulfur, together with a further increase in pore volume and surface area of the catalyst, and accordingly is preferred.

Cobalt impregnation may be accomplished using water soluble cobalt salts, preferably sulfur-free water soluble cobalt salts such as cobalt nitrate and cobalt acetate. Impregnation may be done by the well-known techniques of incipient wetness, adsorption from solution or evaporation of the salt onto the catalyst. Because of ease of operation, incipient wetness technique is preferred.

The calcination is carried out for about 2 to 15 hours, preferably about 3 to 6 hours, in an oxidizing atmosphere, such as air, in order to maintain support integrity and to facilitate coke removal. The cobalt salt is oxidized to a cobalt oxide and carbon is oxidized to gaseous oxides of carbon. The moderate calcination temperatures reduce the risk of the formation of localized hot spots, which would otherwise result in fracture of the catalyst support. However, higher temperatures may be employed by carefully controlling the oxygen content of the atmosphere, as is well-known in the art. A second (2X) cobalt impregnation followed by a second calcination under the conditions given above result in essentially complete removal of carbon and sulfur from the catalyst, and accordingly is most preferred.

Analogous nickel salts may be alternatively employed to impregnate nickel in catalysts such as Mo—Ni/$Al_2O_3$, following the procedures given above for cobalt impregnation.

Catalysts regenerated by the foregoing process were tested for their hydrodesulfurization activity in a flow reactor at temperatures of 310°, 325° and 350° C., pressure of 3.1 MPa and liquid hourly space velocity (LHSV) of about 5.9 to 6.0. It was found that after the first cobalt impregnation and calcination, the catalyst exhibited about 75% HDS activity as compared to fresh commercial Co—Mo/$Al_2O_3$ catalyst. After the second cobalt impregnation and calcination, the HDS activity was nearly 105%, as compared with the fresh commercial catalyst. It is likely that by calcining for longer periods of time with a single cobalt impregnation, the hydrodesulfurization activity of the regenerated catalyst can be equally enhanced.

Metals such as nickel, cobalt, vanadium and the like solubilized by the heteropoly acid can be recovered by conventional solvent extraction, ion exchange or chelation technology. Metals so recovered can be used in the impregnation process (e.g., Co and Co—Mo/$Al_1O_3$ catalyst) or for the manufacture of fresh catalysts. In place of cobalt salts, nickel salts can also be used to aid in coke burning and to provide catalysts containing primarily Mo—Ni/$Al_2O_3$, which are suitable for hydrodenitrogenation reaction in addition to possessing HDS activity.

EXAMPLES

Example 1

Spent Co—Mo/$Al_2O_3$ catalyst, used for hydrodesulfurization of Cold Lake crude, was regenerated. The spent catalyst was small pore size, about 30 to 50 Å average, and loaded with 0.5 to 0.8% nickel and 5 to 8% vanadium. The spent catalyst was first pre-cleaned with benzene or toluene for 5 to 50 hours. Following this procedure, the catalyst was dried at 100° C. under reduced pressure. The spent catalyst was then treated under the following conditions with molybdophosphoric acid (MPA):

A 50 g sample of the spent Co—Mo catalyst was contacted with 500 ml of a 0.4% freshly prepared aqueous solution of dodecamolybdophosphoric acid having the formula $H_3(PMo_{12}O_{40}).24H_2O$ and a pH of 2.0 to 2.5. The flask was maintained at 40° to 60° C. on a rotary shaker at a mixing rate of 150 rpm for 90 to 120 hours. The rate of vanadium extraction was monitored by determining the vanadium content spectrophotometrically in filtered samples at intervals of 24 hours of incubation. The process was terminated when about 80% of the vanadium had been extracted from the catalyst. The percent elemental compositions of spent catalyst and catalyst regenerated by MPA treatment, 1X cobalt impregnation, 1X calcination (Runs 68, 71, 73 and 74) and 2X cobalt impregnation, 2X calcination (Run 76) are summarized in Table I.

Cobalt impregnation was done by incipient wetness technique, employing cobalt acetate; calcination was carried out at 450° C. for 2 hours in air. Following treatment, 70 to 80% vanadium, 98% nickel and about 45% cobalt were extracted from the catalyst. There was no change in Mo or $Al_2O_3$ concentration. In all batches, the alumina support remained unchanged, as indicated by aluminum crystallite size (determined by X-ray diffraction pattern). The amount of sulfur and cat carbon reduction in samples treated with MPA alone and in samples 1× and 2× calcined after 1× and 2× cobalt impregnation, respectively, are summarized in Tables II and III, respectively. Sulfur was analyzed by ASTM D1552-62 method and cat carbon was analyzed by modified ASTM E-30-56 method. The hydrodesulfurization activity of fresh catalyst, spent catalyst and spent catalyst regenerated by MPA treatment followed by 1× cobalt impregnation and 1× calcination (Runs 68, 71, 73 and 74) and 2× cobalt impregnation and 2× calcination (Run 76) are summarized in Table IV. Catalyst activity was determined by conversion of dibenzothiophene (DBT) to biphenyl, hydrogenated biphenyl and $H_2S$. For Runs 68, 71, 73 and 74, the HDS activity of the regenerated catalyst approached that of the fresh catalyst at temperatures of 310°, 325° and 350° C. For Run 76, the HDS activity at these temperatures was at least 3% greater than that of the fresh catalyst. The increase in surface area ($m^2/g$) and pore volume ($cm^3/g$) of spent catalyst compared with regenerated catalyst after (1) MPA treatment alone; (2) MPA treatment followed by 1× cobalt impregnation, 1× calcination; and (3) MPA treatment followed by 2× cobalt impregnation, 2× calcination are summarized in Table V.

TABLE I

PERCENT ELEMENTAL COMPOSITION OF SPENT AND MOLYBDOPHOSPHORIC ACID (MPA) TREATED SPENT Co—Mo/$Al_2O_3$ CATALYST

| Sample | Cat Carbon | (1) $SO_4$—S | (2) CoO | (2) $MoO_3$ | (2) $V_2O_5$ | (2) NiO | (3) $Al_2O_3$ | % Total |
|---|---|---|---|---|---|---|---|---|
| Spent catalyst | 11.20 | 9.34 | 3.45 | 8.25 | 11.50 | 0.77 | 54.00 | 98.54 |
| Run 68 (4) | 8.20 | 4.88 | 1.34 | 20.58 | 4.50 | — | 56.00 | 95.52 |
| Run 68 (4,5) | 3.06 | 1.92 | 2.91 | 19.40 | 4.17 | — | 68.00 | 99.46 |
| Run 71 (4) | 8.20 | 4.88 | 1.35 | 17.94 | 5.75 | — | 56.00 | 94.12 |
| Run 71 (4,5) | 0.39 | 1.89 | 2.98 | 23.74 | 6.44 | — | 68.00 | 104.94 |
| Run 73 (4) | 8.20 | 4.88 | 1.34 | 19.06 | 5.01 | — | 56.00 | 94.51 |
| Run 73 (4,5) | 1.58 | 1.92 | 3.15 | 20.55 | 5.76 | — | 68.00 | 100.96 |
| Run 74 (4) | 8.40 | 2.52 | 1.26 | 19.06 | 4.56 | — | 58.00 | 94.00 |
| Run 74 (4,5,6) (ave.) | 0.23 | 1.29 | 6.16 | 24.52 | 4.74 | — | 67.00 | 103.94 |
| Run 76 (4) | 8.60 | 1.82 | 1.70 | 22.60 | 2.88 | — | 56.00 | 93.64 |
| Run 76 (4,5) | 3.64 | 0.72 | 2.50 | 27.90 | 2.91 | — | 68.00 | 105.51 |
| Run 76 (4- 7) (ave.) | 0.46 | 0.66 | 5.20 | 28.50 | 3.60 | — | 68.70 | 107.72 |

(1) Assumed 50% total sulfur as sulfate.
(2) By X-ray fluorescence spectrophotometry.
(3) According to ASMA modified method no. ASTM E-120.
(4) MPA treated.
(5) MPA treated 1x cobalt impregnated (cobalt content 2-4%) and 1x calcined.
(6) MPA treated 1x cobalt impregnated (cobalt content 4.80%) and 1x calcined.
(7) MPA treated 2x cobalt impregnated (cobalt content 4-5%) and 2x calcined.

TABLE II

PERCENT SULFUR REMOVED FROM MOLYBDOPHOSPHORIC ACID (MPA) TREATED SPENT Co—Mo/$Al_2O_3$ CATALYST

| Sample | Initial Sulfur | After MPA Treatment | % Reduction | Residual Sulfur After 1x Cobalt Impregnation & 1x Calcination | % Reduction | Residual Sulfur After 2x Cobalt Impregnation & 2x Calcination | % Reduction |
|---|---|---|---|---|---|---|---|
| Spent catalyst | 6.25 | — | 0 | — | — | — | — |
| Spent catalyst | 6.25 | — | — | 4.05 | 36.0 | — | — |
| Run 68 | 6.25 | 3.25 | 48 | 1.29 | 80.0 | — | — |
| Run 71 | 6.25 | 3.25 | 48 | 1.66 | 74.0 | — | — |
| Run 73 | 6.25 | 3.25 | 48 | 1.29 | 80.0 | — | — |
| Run 74 | 4.17 | 1.69 | 59 | 0.86 | 80.0 | — | — |
| Run 76 | 4.17 | 1.27 | 70 | 0.49 | 88.0 | 0.44 | 90.0 |

TABLE III

EFFECT OF TYPE OF MIXING AND COBALT DOPING ON CAT-CARBON REMOVAL FROM SPENT AND MOLYBDOPHOSPHORIC ACID (MPA) TREATED Co—Mo/$Al_2O_3$ CATALYST

| Sample | Initial % Cat Carbon | Treatment | Residual % Cat Carbon | % Cat Carbon Removed |
|---|---|---|---|---|
| Spent catalyst | 11.20 | None | — | 0 |
| Spent catalyst | 11.20 | Calcined | 7.4 | 33 |
| Spent catalyst | 11.20 | 1x Co Impregnated and 1x Calcined | 3.06 | 73 |
| Run 68 (1) | 11.20 | MPA Treated | 8.20 | 27 |
| Run 68 (1) | 11.20 | MPA Treated, 1x Co Impregnated and 1x Calcined | 3.10 | 72 |
| Run 71 (2) | 11.20 | MPA Treated, 1x Co Impreg- | 0.39 | 99 |

TABLE III-continued
EFFECT OF TYPE OF MIXING AND COBALT DOPING ON CAT-CARBON REMOVAL FROM SPENT AND MOLYBDOPHOSPHORIC ACID (MPA) TREATED Co—Mo/Al$_2$O$_3$ CATALYST

| Sample | Initial % Cat Carbon | Treatment | Residual % Cat Carbon | % Cat Carbon Removed |
|---|---|---|---|---|
| | | nated and 1x Calcined | | |
| Run 73 (1) | 11.20 | MPA Treated, 1x Co Impregnated and 1x Calcined | 1.58 | 87 |
| Run 74 (2) | 11.80 | MPA Treated, 1x Co Impregnated and 1x Calcined | 0.23 | 98 |
| Run 76 (1) | 11.80 | MPA Treated, 1x Co Impregnated and 1x Calcined | 3.71 | 69 |
| Run 76 (1) | 11.80 | MPA Treated, 2x Co Impregnated and 2x Calcined | 0.45 | 96 |

(1) Mixing by shaking;
(2) Mixing in concurrently moving liquid-solid bed.

TABLE IV
HYDRODESULFURIZATION ACTIVITY OF FRESH, SPENT AND MOLYBDOPHOSPHORIC (MPA) TREATED Co—Mo/Al$_2$O$_3$ CATALYST

| Sample | Mole Percent DBT Conversion | | |
|---|---|---|---|
| | 310° C. | 325° C. | 350° C. |
| Fresh catalyst (commerical) | 49 | 77 | 95 |
| Spent catalyst (1,3) | 10 | 23 | 44 |
| Run 68 (2,3) | 44 | 65 | 91 |
| Run 72 (2,4) | 29 | 55 | 82 |
| Run 73 (2,3) | 31 | 55 | 81 |
| Run 74 (2,4,5) (ave.) | 31 | 55 | 81 |
| Average of Runs 68,72,73&74 | 34 | 58 | 85 |
| % Activity of fresh catalyst | 69 | 76 | 89 |
| Run 76 (3,6) | 54 | 84(7) | 98 |
| % Activity of fresh catalyst | 110 | 110 | 103 |

(1) Solvent extracted, 1x Co impregnated and 1x calcined.
(2) MPA treated, 1x Co impregnated and 1x calcined. Cobalt content 2-4%.
(3) Mixing by shaking.
(4) Mixing in concurrently moving liquid-solid bed.
(5) Cobalt content 4.80%.
(6) MPA treated, 2x Co impregnated and 2x calcined. Cobalt content 4-5%.
(7) Estimated by exprapolation of 310° and 350° C. data.

TABLE V
SURFACE AREA (SA) AND PORE VOLUME (PV) OF SPENT AND MOLYBDOPHOSPHORIC ACID (MPA) TREATED Co—Mo/Al$_2$O$_3$ CATALYST

| | Initial | | After MPA Treatment | | After 1x Impregnation & 1x Calcination | | After 2x Impregnation & 1x Calcination | |
|---|---|---|---|---|---|---|---|---|
| Sample | S.A. m$^2$/g | P.V. cm$^3$/g | S.A. m$^2$/g | P.V. cm$^3$/g | S.A.m$^2$/g | P.V.cm$^3$/g | S.A.m$^2$/g | P.V.cm$^3$/g |
| Spent catalyst | 136 | 0.24 | — | — | — | — | — | — |
| Run 68 | 136 | 0.24 | 201 | 0.34 | 227 | 0.43 | — | — |
| Run 71 | 136 | 0.24 | 200 | 0.31 | 204 | 0.36 | — | — |
| Run 73 | 136 | 0.24 | 196 | 0.35 | 222 | 0.43 | — | — |
| Run 74 | 166 | 0.27 | 233 | 0.43 | 239 | 0.49 | — | — |
| Run 76 | 131 | 0.25 | 211 | 0.36 | 291 | 0.52 | 275 | 0.59 |

EXAMPLE 2

Spent Co—Mo/Al$_2$O$_3$ catalyst, used for hydrodesulfurization of Cold Lake crude, was regenerated. The spent catalyst was large pore size, about 100 to 150 Å average, and highly loaded with metals (6% nickel and 18% vanadium). The spent catalyst was first pre-cleaned with toluene for 48 hours. Following this procedure, the catalyst was dried at 100° C. under reduced pressure. The spent catalyst was then treated under the following conditions with molybdophosphoric acid (MPA):

A 20 g sample of the solvent-extracted, spent Co—Mo catalyst was suspended in 1000 ml of 0.4% freshly prepared aqueous solution of dodecamolybdophosphoric acid of the formula H$_3$(PMo$_{12}$O$_{40}$).24H$_2$O at a pH of 2.0 to 2.5. The system was maintained at 40° to 60° C. on a rotary shaker at a mixing rate of 100 to 120 rpm. Samples at various intervals were withdrawn and clarified by sedimentation. The clarified fluids were monitored by atomic absorption spectroscopy for the determination of vanadium and nickel concentrations. The percent elemental compositions of spent catalyst and catalyst regenerated by MPA treatment, and 2× cobalt impregnation and 2× calcination are presented in Table VI. After 90 to 120 hours, 70 to 80% vanadium, 93% nickel, and about 40% cobalt were extracted from the catalyst. There was no change in Mo or Al$_2$O$_3$ concentration. Cobalt impregnation was done by incipient wetness technique, employing cobalt nitrate; calcination was carried out at 400° C. for 2 hours in air. The regenerated catalyst was analyzed for sulfur by ASTM D1552-62 method and for cat carbon by modified ASTM E-30-56 method. The percent sulfur and cat carbon removed after 2× cobalt impregnation and 2× calcination are presented in Tables VII and VIII, respectively. The demetallized, 2× cobalt impregnated and 2× calcined material exhibited 84, 86 and 99% hydrodesulfurization activity of a fresh, small pore, low metals loaded Co—Mo catalyst at temperatures of 310°, 325° and 350° C., respectively, as shown in Table IX.

The increase in surface area (m$^2$/g) and pore volume (cm$^3$/g) of spent catalyst compared with regenerated catalyst after MPA treatment followed by 2× cobalt impregnation, 2× calcination are summarized in Table X.

The low surface area and pore volume values indicated for Run 81 are attributed to an increase in pellet density due to heavy carbon and metals loading and high attrition of the catalyst under process conditions. The low pore volume obtained after MPA treatment, cobalt impregnation and calcination is probably due to loading the pores by MPA and cobalt. It should be noted that calcining the catalyst after cobalt impregnation increased the surface area by 36%.

TABLE VI
PERCENT ELEMENTAL COMPOSITION OF SPENT AND MOLYBDO-PHOSPHORIC ACID (MPA) TREATED SPENT Co—Mo/Al$_2$O$_3$ CATALYST

| Sample | Cat Carbon | (1) SO$_4$—S | (2) CoO | (2) MoO$_3$ | (2) V$_2$O$_5$ | (2) NiO | (3) Al$_2$O$_3$ | % Total |
|---|---|---|---|---|---|---|---|---|
| Spent catalyst | 20.16 | 19.28 | 1.14 | 5.70 | 38.36 | 6.45 | 21.72 | 112.81 |
| Run 81 (4) | 0.54 | 1.15 | 7.12 | 51.0 | 8.03 | 0.16 | 50.11 | 118.11 |

(1) Assumed 50% total sulfur as sulfate.
(2) By X-ray fluorescence spectrophotometry.
(3) According to ASMA modified method No. ASTM-E120
(4) MPA treated, 2x cobalt impregnated (cobalt content 4–5%) and 2x calcined.

TABLE VII
PERCENT SULFUR REMOVED FROM MOLYBDOPHOSPHORIC ACID (MPA) TREATED SPENT Co—Mo/Al$_2$O$_3$ CATALYST

| Sample | Initial Sulfur | After MPA Treatment | % Reduction | Residual Sulfur After 2x Cobalt Impregnation and 2x Calcination | % Reduction |
|---|---|---|---|---|---|
| Spent catalyst | 6.25 | — | 0 | — | — |
| Run 81 | 19.28 | 14.70 | 24 | 1.15 | 94 |

TABLE VIII
EFFECT OF TYPE OF MIXING AND COBALT DOPING ON CAT-CARBON REMOVAL FROM SPENT AND MOLYBDOPHOSPHORIC ACID (MPA) TREATED Co—Mo/Al$_2$O$_3$ CATALYST

| Sample | Inital % Cat Carbon | Treatment | Residual % Cat Carbon | % Cat Carbon Removed |
|---|---|---|---|---|
| Spent catalyst | 20.16 | None | — | 0 |
| Run 81 (1) | 20.16 | MPA Treated, 2x Co Impregnated and 2x Calcined (1) | 0.54 | 97 |

(1) Mixing rate 100 rpm.

TABLE IX
HYDRODESULFURIZATION ACTIVITY OF FRESH, SPENT AND MOLYBDOPHOSPHORIC ACID (MPA) TREATED Co—Mo/Al$_2$O$_3$ CATALYST

| Sample | Mole Percent DBT Conversion 310° C. | 325° C. | 350° C. |
|---|---|---|---|
| Fresh catalyst (commerical) | 49 | 77 | 95 |
| Run 81 (1,2) | 41 | 66 | 94 |
| % Activity of Fresh Catalyst | 84 | 86 | 99 |

(1) Mixing by shaking at 100 rpm.
(2) MPA treated, 2x Co impregnated and 2x calcined. Cobalt content 4–5%.

TABLE X
SURFACE AREA (SA) AND PORE VOLUME (PV) OF SPENT AND MOLYBDOPHOSPHORIC ACID (MPA) TREATED Co— Mo/Al$_2$O$_3$ CATALYST

| Sample | Initial S.A. m$^2$/g | Initial P.V. cm$^3$/g | After 2× Impregnation and 2× Calcination S.A.m$^2$/g | After 2× Impregnation and 2× Calcination P.V.cm$^3$/g |
|---|---|---|---|---|
| Run 81 | 87 | 0.12 | 118 | 0.07 |

EXAMPLE 3

The following heteropoly acids were investigated for their ability to extract vanadium and nickel deposited on Co—Mo HDS catalys during process conditions:

Four 1 g samples of so. nt-cleaned, small pore size, spent Co—Mo HDS catalyst (as in Example 1) were placed in a 300 ml Erlenmeyer flask. To each flask was added 100 ml of a 0.4 g wt. % aqueous solution of the following heteropoly acids: dodecamolybdophosphoric acid, H$_3$(PMo$_{12}$O$_{40}$).24H$_2$O, dodecamolybdosilicic acid, H$_4$(SiMo$_{12}$O$_{40}$).24H$_2$O, dodecatungstophosphoric acid, H$_3$(PW$_{12}$O$_{40}$).24H$_2$O, and dodecatungstosilicic acid, H$_4$(SiW$_{12}$O$_{40}$).24H$_2$O. The flasks containing the catalyst and the heteropoly acid were maintained at 60° C. on a rotary shaker at a mixing rate of 100 rpm. At the end of 24 hours, the extracts were separated from the catalysts by decantation and passed through 0.2 μm size Millipore filters. The catalysts were resuspended in 100 ml quantities of fresh heteropoly acids and the flasks were maintained for an additional 24 hours under the same conditions described above. At the end of the second 24 hour period, the extracts were separated from the catalysts by decantation and the catalysts were washed thoroughly with deionized distilled water and dried at 100° C. for 48 hours. The dried catalysts were stored under nitrogen until subsequent analysis. The second 24 hour period extracts were treated in the same manner as the first extracts. The pH values of the first and second 24 hour extracts were determined. The pH changes are summarized in Table XI. Vanadium, nickel, cobalt, molybdenum and aluminum concentrations in each of the filtered extracts were determined by atomic absorption spectroscopy. The percent metals extracted by each of the heteropoly acids from the spent Co—Mo HDS catalyst are summarized in Table XII.

EXAMPLE 4

The surface area and pore volume of spent and treated catalysts (small pore) were determined as a function of heteropoly acid treatment. The results are given in Table XIII, below.

TABLE XIII

SURFACE AREA AND PORE VOLUME OF SOLVENT EXTRACTED SPENT CATALYST, FOLLOWED BY HETEROPOLYACID EXTRACTION

| Heteropoly Acid Treatment | Surface Area m²/g | Pore Volume cm³/g |
|---|---|---|
| Spent catalyst | 166 | 0.212 |
| $H_3(PMo_{12}O_{40}).24H_2O$ | 220 | 0.313 |
| $H_4(SiMo_{12}O_{40}).24H_2O$ | 223 | 0.350 |
| $H_3(PW_{12}O_{40}).24H_2O$ | 199 | 0.299 |
| $H_4(SiW_{12}O_{40}).24H_2O$ | 217 | 0.306 |
| Fresh catalyst | 265 | 0.50 |

Table XIII clearly demonstrates that upon treatment with a heteropoly acid, both surface area and pore volume increase significantly.

TABLE XI pH CHANGES DURING FIRST AND SECOND 24 HOUR PERIOD OF HETEROPOLY ACID EXTRACTS OF SPENT Co—Mo HDS CATALYST

| Heteropoly Acid | Initial pH | pH at end of 1st 24 hr. extraction | Initial pH fresh acid | pH at end of 2nd 24 hr. extraction |
|---|---|---|---|---|
| $H_3(PMo_{12}O_{40}).24H_2O$ | 2.32 | 2.92 | 2.32 | 2.78 |
| $H_4(SiMo_{12}O_{40}).24H_2O$ | 2.20 | 3.20 | 2.20 | 2.86 |
| $H_3(PW_{12}O_{40}).24H_2O$ | 2.30 | 3.30 | 2.30 | 3.16 |
| $H_4(SiW_{12}O_{40}).24H_2O$ | 2.40 | 3.40 | 2.40 | 3.22 |

TABLE XII

PERCENT METALS EXTRACTED BY HETEROPOLY ACID AFTER 48 HOURS FROM SPENT Co—Mo HDS CATALYST

| Heteropoly Acid | V | Ni | Co | Mo | Al |
|---|---|---|---|---|---|
| $H_3(PMo_{12}O_{40}).24H_2O$ | 80 | 80 | 40 | 0 | 0 |
| $H_4(SiMo_{12}O_{40}).24H_2O$ | 89 | 90 | 50 | 0 | 0 |
| $H_3(PW_{12}O_{40}).24H_2O$ | 63 | 90 | 50 | 0 | 0 |
| $H_4(SiW_{12}O_{40}).24H_2O$ | 66 | 95 | 60 | 0 | 0 |

What is claimed is:

1. An improved process for regenerating spent hydrofining catalysts which comprises contacting spent catalyst with an aqueous solution of a heteropoly acid to extract vanadium and nickel, impregnating with a water soluble cobalt or nickel salt and calcining at a maximum temperature of about 450° C.

2. The process of claim 1 in which the catalyst is impregnated with a water soluble cobalt salt.

3. The process of claim 1 in which the impregnation and calcination are repeated at least once.

4. The process of claim 1 in which the hydrofining catalyst comprises a cobalt-molybdenum loaded alumina support.

5. The process of claim 1 in which the heteropoly acid is represented by the general formula $H_x(YM_{12}O_{40})$, where Y is at least one element selected from the group consisting of phosphorus, silicon, titanium, germanium, arsenic, zirconium, thorium and cerium, M is at least one element selected from the group consisting of molybdenum, tungsten, niobium and tantalum and x is 3 when Y is pentavalent and 4 when Y is tetravalent.

6. The process of claim 5 in which Y is at least one of phosphorus and silicon and M is at least one of molybdenum and tungsten.

7. The process of claim 6 in which Y is phosphorus and M is molybdenum.

8. The process of claim 6 in which Y is phosphorus and M is tungsten.

9. The process of claim 6 in which Y is silicon and M is molybdenum.

10. The process of claim 6 in which Y is silicon and M is tungsten.

11. The process of claim 5 in which up to one-half of M is replaced by at least one element selected from the group consisting of nickel, cobalt and vanadium.

12. The process of claim 1 in which the spent catalyst is contacted with the heteropoly acid at a temperature between ambient and about 80° C.

13. The process of claim 12 in which the temperature ranges from about 30° to 60° C.

14. The process of claim 1 in which the heteropoly acid is dissolved in an aqueous medium in a concentration ranging from about 0.1 to 25 wt. %.

15. The process of claim 14 in which the concentration ranges from about 0.2 to 6 wt. %.

16. The process of claim 14 in which the aqueous solution has a pH ranging from about 1 to 3.

17. The process of claim 16 in which the pH ranges from about 1.5 to 2.5.

18. The process of claim 1 in which the spent catalyst is contacted with heteropoly acid for a period of time of between about 4 to 200 hours.

19. The process of claim 8 in which the period of contact ranges from about 15 to 90 hours.

* * * * *